US009350760B2

(12) United States Patent
Tirosh et al.

(10) Patent No.: US 9,350,760 B2
(45) Date of Patent: May 24, 2016

(54) METHOD AND SYSTEM FOR IMPLEMENTING MANDATORY FILE ACCESS CONTROL IN NATIVE DISCRETIONARY ACCESS CONTROL ENVIRONMENTS

(71) Applicant: McAfee, Inc., Santa Clara, CA (US)

(72) Inventors: Oren Tirosh, Tel-Aviv (IL); Eran Werner, Raanana (IL)

(73) Assignee: McAfee, Inc., Santa Clara, CA (US)

( * ) Notice: Subject to any disclaimer, the term of this patent is extended or adjusted under 35 U.S.C. 154(b) by 54 days.

(21) Appl. No.: 14/162,549

(22) Filed: Jan. 23, 2014

(65) Prior Publication Data

US 2014/0137185 A1  May 15, 2014

Related U.S. Application Data

(63) Continuation of application No. 13/323,994, filed on Dec. 13, 2011, now Pat. No. 8,671,448, which is a continuation of application No. 11/703,778, filed on Feb. 8, 2007, now Pat. No. 8,087,065.

(51) Int. Cl.
*H04L 29/06* (2006.01)
*G06F 21/62* (2013.01)
*G06F 17/00* (2006.01)
*G06F 7/04* (2006.01)
*G06F 17/30* (2006.01)

(52) U.S. Cl.
CPC ............... *H04L 63/20* (2013.01); *G06F 21/62* (2013.01); *G06F 21/6218* (2013.01); *H04L 63/104* (2013.01); *H04L 63/105* (2013.01); *G06F 2221/2141* (2013.01)

(58) Field of Classification Search
None
See application file for complete search history.

(56) References Cited

U.S. PATENT DOCUMENTS

| 5,991,877 | A  | * | 11/1999 | Luckenbaugh | 726/1 |
|---|---|---|---|---|---|
| 7,827,615 | B1 | * | 11/2010 | Allababidi et al. | 726/28 |
| 8,087,065 | B2 |   | 12/2011 | Tirosh et al. | |
| 8,266,702 | B2 | * | 9/2012 | Naldurg et al. | 726/25 |
| 2002/0053032 | A1 |   | 5/2002 | Dowling et al. | |
| 2003/0172109 | A1 |   | 9/2003 | Dalton et al. | |

(Continued)

OTHER PUBLICATIONS

Office Action received for U.S. Appl. No. 13/323,994, mailed on Jul. 9, 2013, 6 Pages.

(Continued)

*Primary Examiner* — Shin-Hon Chen
(74) *Attorney, Agent, or Firm* — Blank Rome LLP (57) ABSTRACT

A method is provided for implementing a mandatory access control model in operating systems which natively use a discretionary access control scheme. A method for implementing mandatory access control in a system comprising a plurality of computers, the system comprising a plurality of information assets, stored as files on the plurality of computers, and a network communicatively connecting the plurality of computers, wherein each of the plurality of computers includes an operating system that uses a discretionary access control policy, and wherein each of a subset of the plurality of computers includes a software agent component operable to perform the steps of intercepting a request for a file operation on a file from a user of one of the plurality of computers including the software agent, determining whether the file is protected, if the file is protected, altering ownership of the file from the user to another owner, and providing access to the file based on a mandatory access control policy.

21 Claims, 6 Drawing Sheets

(56) References Cited

U.S. PATENT DOCUMENTS

| | | |
|---|---|---|
| 2004/0088536 A1 | 5/2004 | Lim et al. |
| 2005/0138423 A1 | 6/2005 | Ranganathan |
| 2005/0268336 A1 | 12/2005 | Finnegan |
| 2006/0053426 A1 | 3/2006 | Dive-Reclus et al. |
| 2007/0101418 A1* | 5/2007 | Wood et al. .................. 726/8 |
| 2007/0130458 A1* | 6/2007 | Focke et al. ................ 713/164 |
| 2007/0180509 A1 | 8/2007 | Swartz et al. |
| 2008/0010233 A1 | 1/2008 | Sack et al. |
| 2008/0155652 A1* | 6/2008 | DeBie ............................ 726/2 |

OTHER PUBLICATIONS

Notice of Allowance received for U.S. Appl. No. 13/323,994, mailed on Oct. 28, 2013, 7 Pages.

Office Action received for U.S. Appl. No. 11/703,778, mailed on Aug. 25, 2010, 6 Pages.

Office Action received for U.S. Appl. No. 13/323,994, mailed on Mar. 7, 2013, 8 Pages.

Notice of Allowance received for U.S. Appl. No. 11/703,778, mailed on Aug. 30, 2011, 5 Pages.

Office Action received for U.S. Appl. No. 11/703,778, mailed on Feb. 4, 2011, 6 Pages.

Office Action received for U.S. Appl. No. 11/703,778, mailed on Mar. 29, 2010, 6 Pages.

* cited by examiner

METHOD AND SYSTEM FOR IMPLEMENTING MANDATORY FILE ACCESS CONTROL IN NATIVE DISCRETIONARY ACCESS CONTROL ENVIRONMENTS

CROSS REFERENCE TO RELATED APPLICATIONS

This is a continuation application of U.S. patent application Ser. No. 13/323,995, filed 13 Dec. 2011, which is a continuation of U.S. patent application Ser. No. 11/703,778 filed 8 Feb. 2007, now U.S. Pat. No. 8,087,065, each of which is incorporated by reference herein in its entirety and to which priority is claimed.

BACKGROUND OF THE INVENTION

1. Field of the Invention

The present invention relates to implementing a mandatory access control model in operating systems which natively use a discretionary access control scheme.

2. Description of the Related Art

Access Control systems in data processing environments are generally classified as either Mandatory Access Control (MAC) or Discretionary Access Control (DAC). Discretionary Access Control (DAC) is defined as a means of restricting access to objects based on the identity and need-to-know of users and/or groups to which the object belongs. Controls are discretionary in the sense that a subject with certain access permission is capable of passing that permission (directly or indirectly) to any other subject. DAC systems permit owners to entirely determine the access granted to their resources. Consequently, in DAC systems owners may accidentally or maliciously grant access to unauthorized users ("unauthorized" as defined by the organization's security officers).

Mandatory access control (MAC) is a kind of access control that restricts access to objects based on the sensitivity (as represented by a label) of the information contained in the objects and the formal authorization i.e., clearance) of users to access information of such sensitivity. Authorization is contingent on a formalized process that documents prerequisite trust in the individual gaining access. An important feature of MAC involves denying users full control over the access to resources that they create. The system security policy (as set by the administrator) entirely determines the access rights granted and a user may not grant less restrictive access to their resources than the administrator specifies. Discretionary access control systems permit users to entirely determine the access granted to their resources, which means that they can (through accident or malice) give access to unauthorized users.

In a MAC system, permissions are set by an administrative authority and cannot be overridden by users. Even file owners are not permitted to grant less restrictive access than that set by the administrator. While the MAC model may be found in some specialized operating systems such as those used by military organizations, common operating systems such as various versions of MICROSOFT WINDOWS® or Unix variants implement the DAC model.

The above security models are not mutually exclusive. In a MAC system the permissions allowed for an object are determined by the system policy set by the administrator. These permissions are the upper bound, and users may still grant more restrictive access to objects they own. If the upper bound permission for an object is allowing access to any user, the MAC model behaves exactly as DAC.

Enforcing the DAC model requires only verification of access rights for individual user operations, and requires no state information. In the MAC model, a sequence of independently allowed operations may lead to an unauthorized result. For example, a user may read information from classified documents and write the same contents to an unprotected file. Thus a MAC system is required to track the system state and prohibit transitions that may lead to breaches of the security policy.

The (Discretionary Access Control) DAC security model provided by common operating systems may not be adequate for the needs of an organization. An add-on product may offer an alternative security model by modifying the rules used for determining the access that users are granted to resources.

A need arises for a technique by which a mandatory access control (MAC) model in may be implemented in an operating system that natively uses a discretionary access control scheme.

SUMMARY OF THE INVENTION

The DAC security model provided by existing operating systems may not be adequate for the needs of the organization. In this case an add-on product may offer an alternative security model and modify the rules used by the operating system for determining the types of accesses users are granted to resources. The present invention includes a method for implementing a mandatory access control model in operating systems which natively use a discretionary access control scheme. The method is implemented by means of a software component ("MAC Agent") which mediates between the user processes and the operating system, intercepts system calls from user processes to the operating system and possibly alters their parameters and results. For various reasons it may not be practical to install such an Agent on all computers in the organization's network. The remaining computers, which do not have the MAC agent installed, will continue to enforce the default security model provided by the operating system. This mixed deployment may result in incomplete enforcement of the alternative model and breaches in security. The present invention addresses this problem and provides an implementation in which the MAC agents are partially deployed, and yet the heterogeneous computer network maintains the integrity of the security model throughout the entire network.

The two primary strategies in the disclosed method are:
1. Prevent users that are not fully trusted from logging into computers which are not equipped with MAC agents. When logged into workstations equipped with MAC agents, the MAC agent will enforce the MAC model by tracking/modifying the access control lists (ACL) of files stored on remote locations and may also prevent users from ACLS of files.
2. Allowing users that are not fully trusted to log in from any computer in the network, but allowing access to sensitive files only if the login is from an agent equipped computer. The ownership of files created by un-trusted users on workstations equipped with MAC agents is modified so as to prevent the user from having full discretionary access control when logged in from workstations without MAC agents.

A method for implementing mandatory access control in a system comprising a plurality of computers, the system comprising a plurality of information assets, stored as files on the plurality of computers, and a network communicatively connecting the plurality of computers, wherein each of the plurality of computers includes an operating system that uses a discretionary access control policy, and wherein each of a subset of the plurality of computers includes a software agent component operable to perform the steps of intercepting a request for a file operation on a file from a user of one of the plurality of computers including the software agent, determining whether the file is protected, if the file is protected, altering ownership of the file from the user to another owner, and providing access to the file based on a mandatory access control policy.

The requested file operation may be at least one of creating the file, writing to the file, or closing the file.

The file may be located on storage local to the computer from which the request for the file operation occurred and the step of altering ownership may comprise the steps of altering ownership of the file and setting an access control list of the file based on the mandatory access control policy. The step of setting the access control list of the file may comprise the step of setting the access control list of the file so as to prevent a user from accessing the file from a computer that does not include the software agent component.

The file may be located on storage remote from the computer from which the request for the file operation occurred and the step of altering ownership may comprise the steps of setting an access control list of the file to allow another owner to take ownership of the file, reopening the file using permissions of the other owner, setting ownership of the file to the other owner, and setting an access control list of the file based on the mandatory access control policy. The other owner may be an account associated with the computer from which the request for the file operation occurred. The software agent component may access the account associated with the computer through a login session already associated with the computer. The other owner may be a separate account for which the agent provides login information and creates a login session. The method may further comprise the steps of intercepting a request for a file read operation on a file from a user of the computer including the software agent, altering the read request, performing the altered read request using a login session not associated with the user. The login session may be established by the software agent component using login information associated with the other owner. The method may further comprise the steps of intercepting a request for a file read operation on a file from a user of the computer including the software agent, altering the read request, performing the altered read request using another login session associated with the user, but having a different set of group memberships than a login session used to request the file read operation. The other login session does not have membership in at least one group to which the login session belongs. The method may further comprise the steps of removing a group membership of a user account, forming a login session for the user account, and restoring the group membership of the user account. The method may further comprise the steps of intercepting an attempt to modify an access control list of a file and allowing the modification based on a criterion. The method may further comprise the step of altering a parameter of the attempt to modify an access control list of a file.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention includes a method for implementing a mandatory access control model in operating systems which natively use a discretionary access control scheme. The method is implemented by means of a software component ("MAC Agent") which mediates between the user processes and the operating system, intercepts system calls from user processes to the operating system and possibly alters their parameters and results. For various reasons it may not be practical to install such an Agent on all computers in the organization's network. The remaining computers, which do not have the MAC agent installed, will continue to enforce the default security model provided by the operating system. This mixed deployment may result in incomplete enforcement of the alternative model and breaches in security. The present invention addresses this problem and provides an implementation in which the MAC agents are partially deployed, and yet the heterogeneous computer network maintains the integrity of the security model throughout the entire network.

Figure 1:
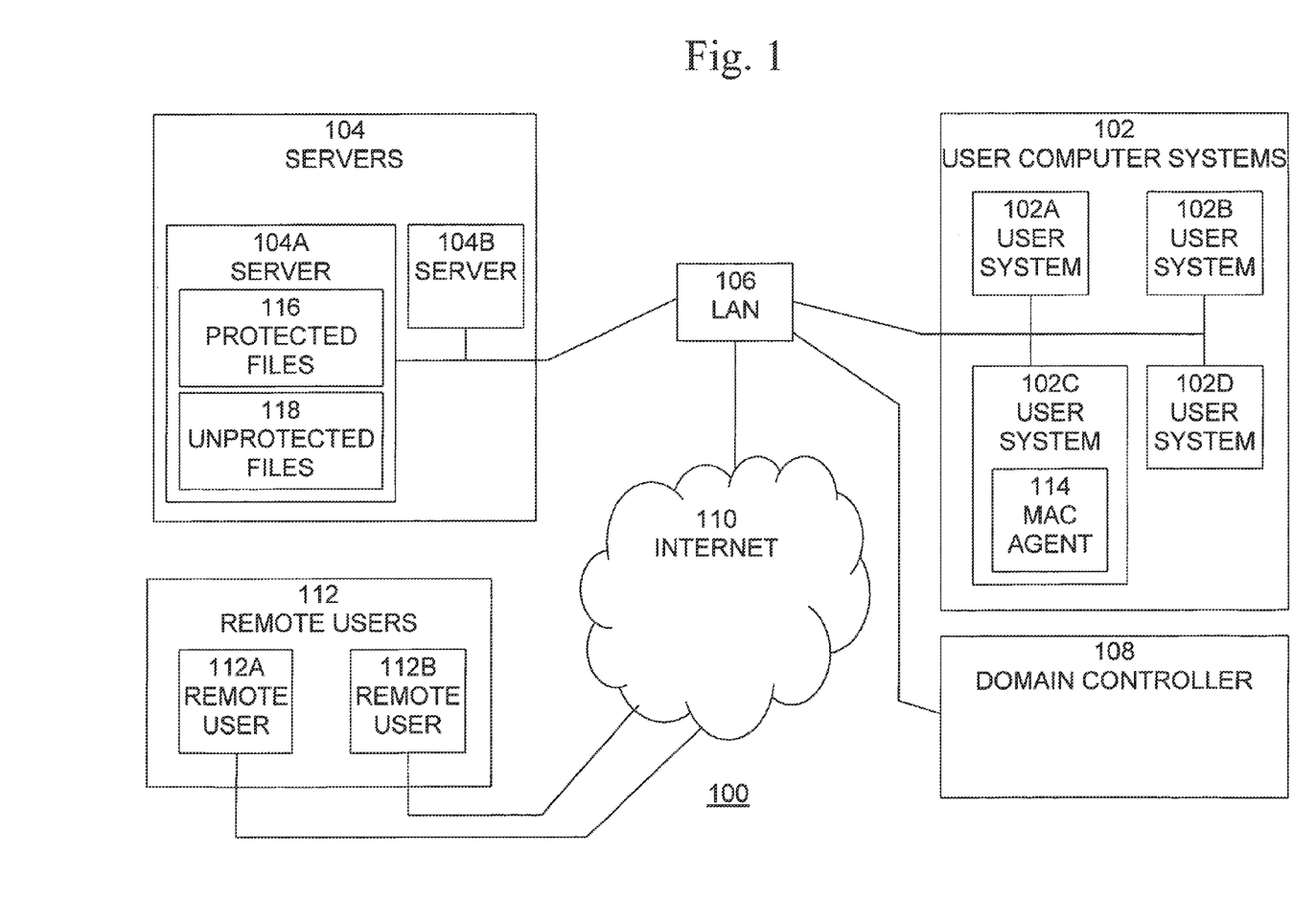
FIG. 1 is an exemplary block diagram of a typical deployment environment, in which the present invention may be implemented.

The present invention includes a method for implementing a mandatory access control model in operating systems which natively use a discretionary access control scheme. The primary contributing element is a software agent which is installed on a subset of the computers and servers of the organizational network. A typical deployment environment is shown in FIG. 1. This environment includes an organizational network 100 comprising user computer systems 102, such as desktop computers, file servers 104, local network (LAN) 106 and a domain controller 108 which provides authentication services for users and workstations on the network. Network 100 may also include connections to the Internet 110, which provides communication with remote user systems 112. The operating system on the computers in the network enforces the default access control model for both local and remote user access to resources such as files.

Figure 2:
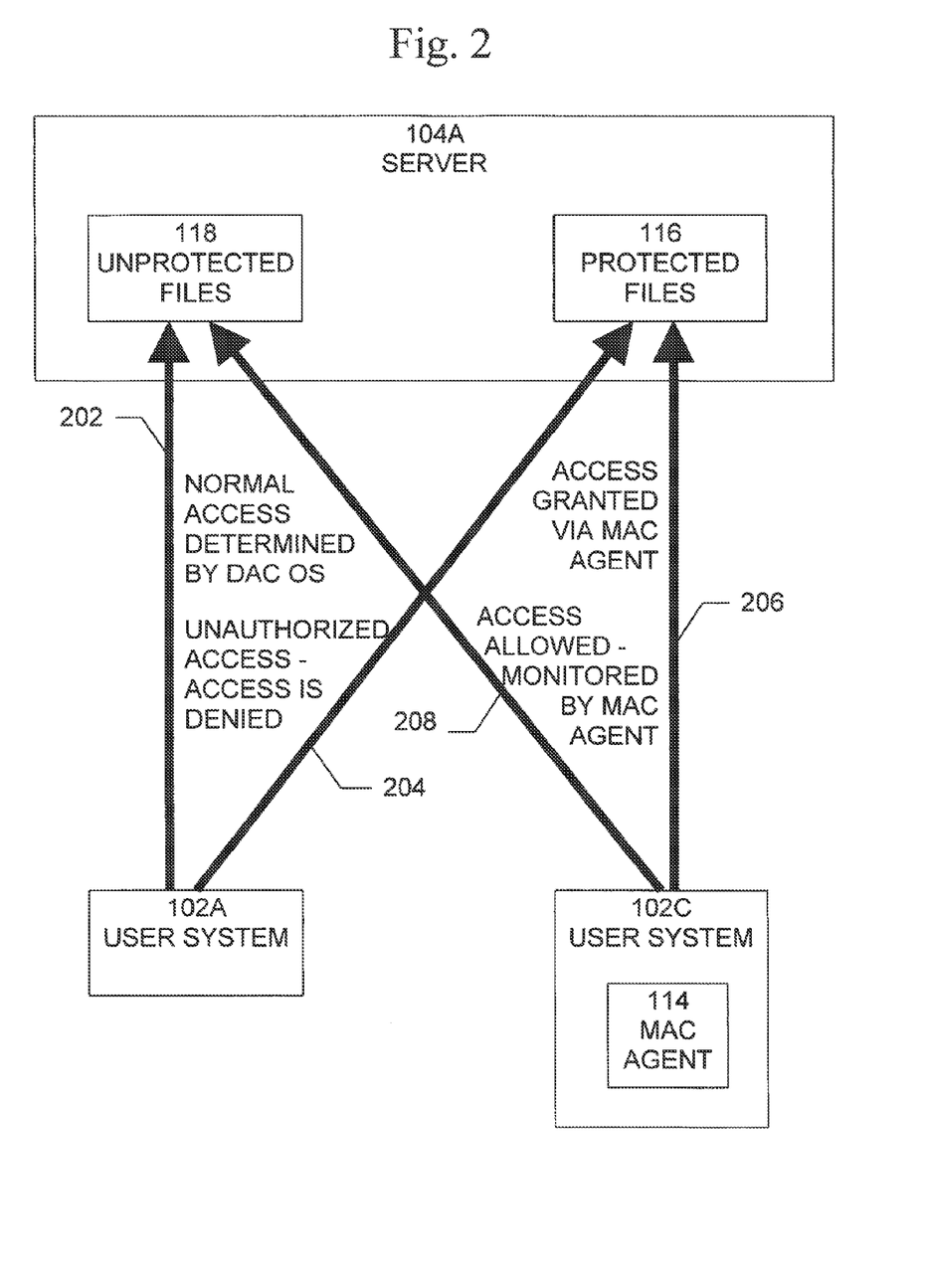
FIG. 2 is an exemplary block diagram of access scenarios in the environment shown in FIG. 1.

Access scenarios on a subset of network 100 are illustrated in FIG. 2. These access scenarios may be illustrated using, for example, two user systems, such as user systems 102A and 102C, and a server, such as server 104A. Some of the user systems, such as user system 102C, are equipped with the MAC agent 114. The file server 104A contains files 116 and 118, some of which 116 are protected by a MAC policy, and some of which 118 are not. It is not required that the MAC agent be installed on the servers. When a non-MAC-protected user system 102A accesses 202 an unprotected file 118, access is determined according to underlying DAC model of the operating system. When a non-MAC-protected user system 102A accesses 204 a MAC protected file 116, the access 204 must be denied, for example, as is described below. When a MAC protected user system 102C accesses 206 a MAC protected resource 116, the access 206 is allowed, possibly requiring the intervention of the MAC agent 114. Finally, when the MAC protected user system 102C accesses 208 an unprotected resource 118, the access 208 is allowed if it is a read access. If the access is a write access, the target resource may be converted to a MAC protected file, or the operation may be blocked if this not possible.

In order to implement the scenarios shown in FIG. 2, a number of strategies may be used. In a first such implementation strategy, access is prevented since all users that are granted access to a file are prohibited from logging into machines with no MAC agents, such as machine 102A. However, other such implementation strategies are possible, as described below.

Restricting Login to Protected Workstation

Figure 3:
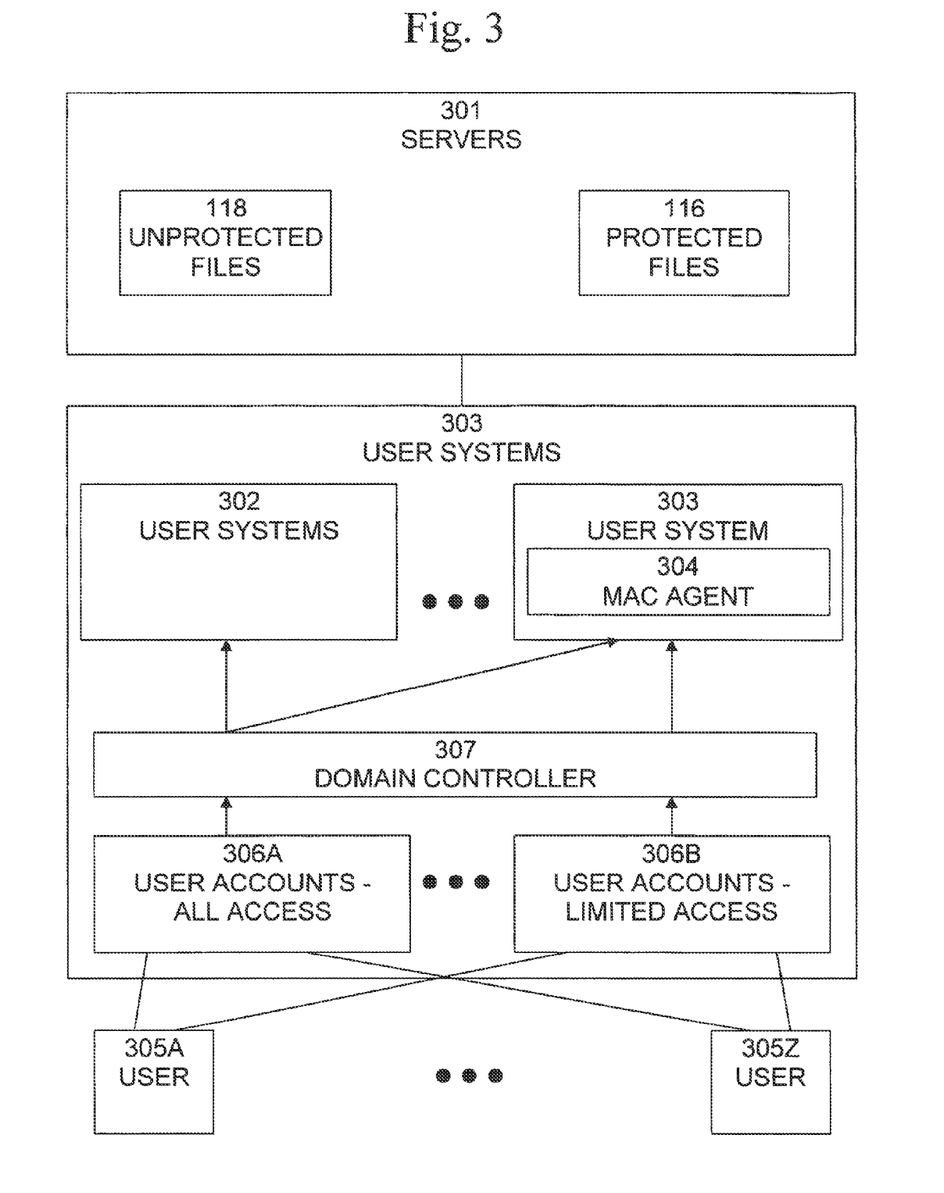
FIG. 3 is an exemplary data flow diagram of an implementation of an access strategy, according to the present invention.

An example of the first implementation strategy is shown in FIG. 3. The network contains files servers 301 and user systems 302 and 303. User systems 303 are equipped with MAC agents 304. Users, such as users 305A-Z may login to and operate the user systems 302 and 303. Each user logs in using a user account associated with the user. The user accounts are classified into two groups. The first group 306A is granted access to all computers in the network. These are either assumed to be trusted users or users not given access to any sensitive data. The second group 306B is of users who must be given access to some sensitive data in order to perform their duties, yet are not completely trusted not to forward sensitive information to unauthorized users. Users in group 306A may log in normally into any workstation station of the network. Users of group 306B are only allowed to login to workstations from group 303, which are equipped with the MAC agent 304. The login authentication and authorization is managed by the domain controller 307. The domain controller contains a mapping of users to computers they may login to. The mapping is set up in accordance with the requirements of this method.

The login restriction is intended to prevent the following scenario: A user having a limited access account 306B logs in to a workstation of group 303 (protected by a MAC agent) and reads a protected file. He later writes a copy of that data into a newly created file, on server 301. MAC agent 304 detects that the file contains sensitive information and automatically sets the ACL of the file to allow access only to the appropriate set of users. If the user was allowed to login to a computer in group 302, he would have been able to access, modify, or forward the contents of the file to unauthorized users. Mandatory access control is enforced in the user systems in group 303 by the MAC agent 304 setting ACL's and preventing changes to the ACL even by the owner of the file. However in the user systems in group 302, the standard DAC model is maintained, in which users can alter ACL of resources they own, at their discretion. It is worth noting that the server 301, while not having an agent installed, preserves the MAC model because it does not perform any operations on files except at the request of users logged in to the user systems 302 and 303.

The obvious limitation of this approach is that users in group 306B may only login to specific user systems even if they do not require access to sensitive files. Referring to FIG. 2, both access 202 and 204 are denied to un-trusted users. To address this problem another implementation strategy is disclosed.

Selective Access Restriction

In the selective access restriction method all users may be allowed to login to all user systems. Referring to FIG. 2, access 202 is permitted since it poses no security risk. However, access 204 must be blocked and distinguished from access 206, performed by a MAC protected user system.

If users are to be allowed to login from workstations with no MAC agent, then it is necessary to prevent them from reading restricted files and modifying their ACL. If the user is the owner of the file, this could not be achieved. Under the DAC model no user can be denied the ability to alter the ACLS of an object he owns. Consequently this refinement requires that objects created by users are to be owned by a different principal. The different principal will ensure that the user could not modify ACLS from workstations with no MAC agents and in any case cannot break the security model as dictated by the MAC policy.

Ownership Hand Off

Figure 4:
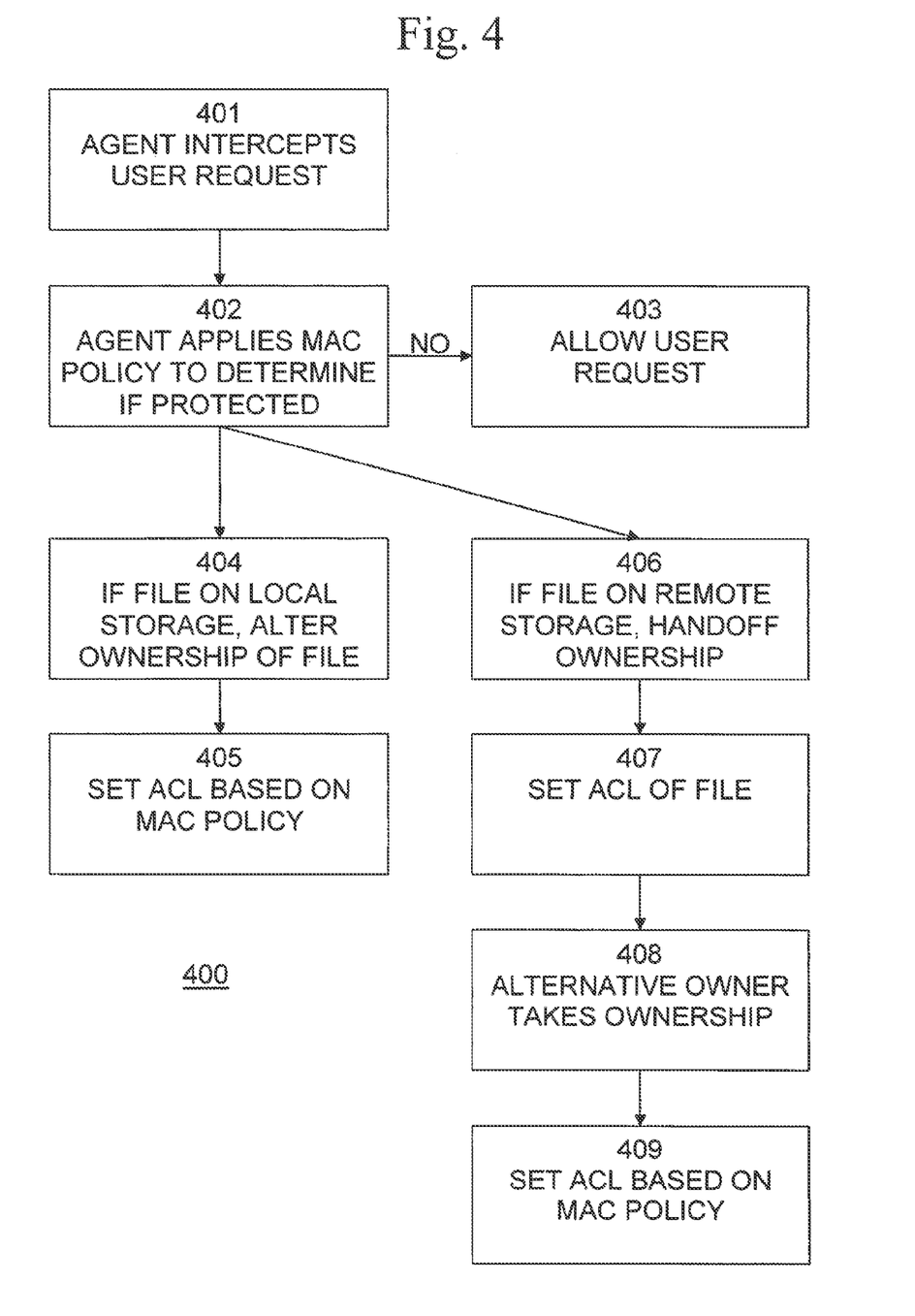
FIG. 4 is an exemplary flow diagram of a process of performing a file operation, according to the present invention.

The present invention uses an ownership handoff technique to replace the owner of the created file. When a user logs in to a workstation equipped with a MAC agent and creates a new file that is determined to require mandatory access control, the process 400 shown in FIG. 4 are performed by the MAC agent:

In step 401, the MAC agent, which is running with system privileges, intercepts the user's request to perform a file operation, such as to create, write or close a file. In step 402, the MAC Agent applies the MAC policy and determines if the file should be protected by MAC. If not, the process continues with step 403, in which the user request is allowed to continue with no further intervention. In step 404, if the file is on local storage, the system privileges are used to alter the ownership of the file to a different principal. For example, the ownership of the file may be altered to belong to a special user account associated with, and controlled by, the MAC agent. Next, in step 405, the ACL of the file is set in accordance with the MAC policy.

If, in step 404, the file is not on local storage, then, in step 406, if the file is located on a remote server, local system privileges will not apply on the remote server. The ownership handoff is therefore performed using additional steps. In step 407, the MAC agent sets the ACL of the file and allows an alternative owner to take ownership of the file. This operation is still performed with the user's permissions. Then, in step 408, the file is reopened by the MAC agent, this time using the alternative principal's permissions. The agent then sets the ownership to the alternative principal. Finally, in step 409, the agent sets the file's ACL according to the MAC policy.

Note that the ACL assigned to the file may grant the creating user some access to the file, even when logged in to a non MAC protected workstation. This will not compromise the security model as long as the granted access does not include read, take ownership and set permission. For example, it may be beneficial to allow the creator delete permissions.

Restoring User Read Access

Files protected by the MAC agent and/or by the described method are given ACL settings that would normally block even their creator from accessing them. This is done to ensure that access 204, shown in FIG. 2, is denied. When such files are accessed from a workstation equipped with a MAC agent (access 206), it is the MAC agent's task to provide a means of allowing the user to access the file.

Figure 5:
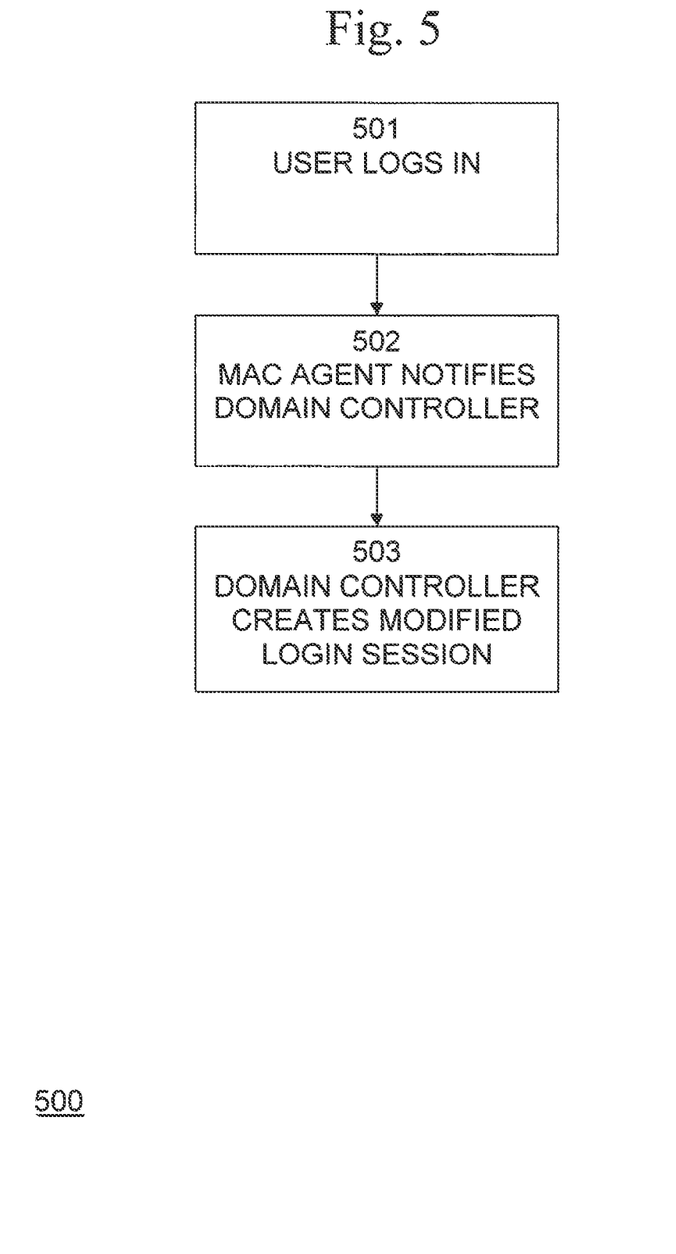
FIG. 5 is an exemplary flow diagram of a process of restoring access to MAC protected files, according to the present invention.

There are a number of ways in which the MAC agent restores access to MAC protected files. One example is process 500, shown in FIG. 5. In step 501, the user logs in, triggering the domain controller to cooperate with the MAC agent. In step 502, the MAC agent notifies the domain control that the workstation is MAC protected. In step 503, in response, the domain controller creates a modified login session that alters the group membership of the user for the duration of the login session. When logging in from a MAC protected workstation the user will be excluded from a group to which all domain users normally belong. The ACL of all MAC protected files will contain an entry denying access to said group. Access to these files will therefore be permitted only during a login session mediated by the MAC agent. This method requires adding a software component to the domain controller that alters the login session parameters with response to the MAC agent's request.

The MAC agent can allow the user to retain a discretionary access control provided the users request does not violate the MAC policy. A typical ACL of a file would include a number of Access Control Entries (ACE). For example, the ACL would include an ACE that is a 'Deny' entry, which denies access to a group which normally includes all users. This would be followed by an 'Allow' entry granting access for the creator (former owner) of the file. This entry should include all permissions except changing ownership and permissions. This entry may be followed by additional allow entries, for example allowing read only access to an entire organizational unit. Note that in this example, only standard operating system access checks are performed, and the MAC agent's sole role in restoring access is altering the login procedure to exclude the user from a group.

Another example of a method which the MAC agent restores access to MAC protected files requires the MAC agent to use a second login session different from the user's normal login session. The agent will need to intercept some user operations and perform them using the secondary login session. When writing a file that is determined to require MAC protection, the agent will change ownership of the file to the identity of the secondary session.

Following the ownership takeover the agent assigns an ACL to the file including the following entries:
I. Deny access to all users
II. Grant access to a group containing the alternative identities used by all MAC agents The secondary identity may be the machine account of each workstation and the group of all workstations protected by MAC agents may be used as the group described above. If we wish to maintain underlying discretionary access control, additional allow entries may follow the two above entries. These additional entries will not be normally effective for users, because they follow an effective deny entry, but may be used by the MAC agent to simulate additional DAC permissions.

When the user attempts to access a MAC protected file, the agent will verify if the user should be allowed to access the file, based on the ACL entries. If access should be granted, the agent will perform the access attempt on behalf of the secondary identity and pass the resulting file handle to the user's process. Note that this implementation does not require cooperation of the domain controller and is fully dependent on interception of user file access requests.

Note that in case the agent relies on the content of the file to determine whether it should be MAC protected, the information regarding the contents may be available only after the file has been written. In such a case, process 400, shown in FIG. 4, will be triggered upon the closure of the file.

Figure 6:
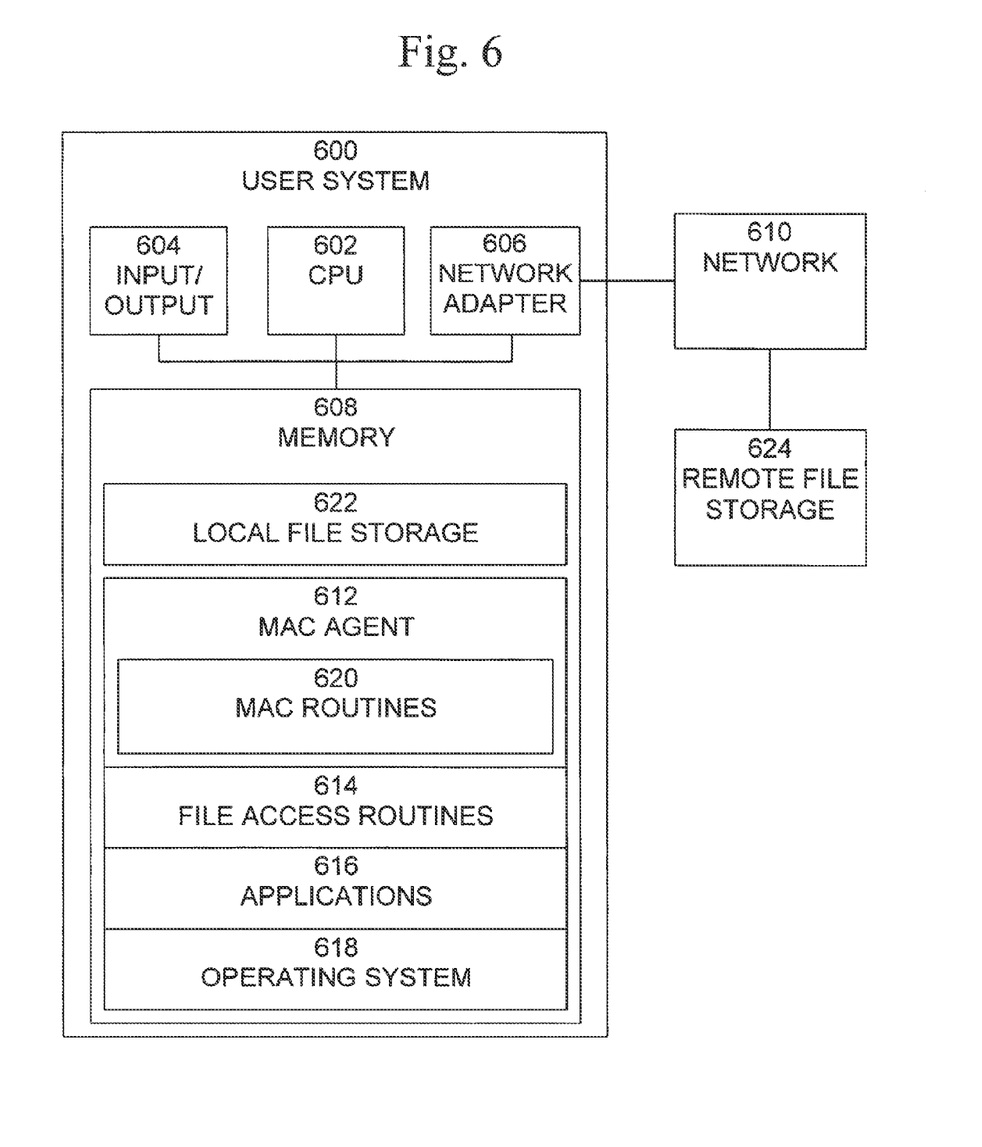
FIG. 6 is an exemplary block diagram of a user system, in which the present invention may be implemented.

A block diagram of an exemplary user system 600, in which the present invention may be implemented, is shown in FIG. 6. User system 600 is typically a programmed general-purpose computer system, such as a personal computer, workstation, server system, and minicomputer or mainframe computer. User system 600 includes processor (CPU) 602, input/output circuitry 604, network adapter 606, and memory 608. CPU 602 executes program instructions in order to carry out the functions of the present invention. Typically, CPU 602 is a microprocessor, such as an INTEL PENTIUM® processor, but may also be a minicomputer or mainframe computer processor. Although in the example shown in FIG. 6, user system 600 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which user system 600 is implemented on a plurality of networked computer systems, which may be single-processor computer systems, multi-processor computer systems, or a mix thereof.

Input/output circuitry 604 provides the capability to input data to, or output data from, user system 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces user system 600 with Internet/intranet 610. Internet/intranet 610 may include one or more standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the functions of user system 600. Memory 608 typically includes electronic memory devices, such as random-access memory (RAM), which are capable of high-speed read and write operations providing direct access by the CPU 602. Additional memory devices included in user system 600 may include read-only memory (ROM), programmable read-only memory (PROM), electrically erasable programmable read-only memory (EEPROM), flash memory, electro-mechanical memory, magnetic disk drives, hard disk drives, floppy disk drives, tape drives, optical disk drives, etc.

Memory 608 includes MAC agent 612, file access routines 614, applications 616, and operating system 618. MAC agent 612 controls the access security policies of user system 600 and includes MAC routines 620, which implement the mandatory access control functions of the present invention. File access routines 614 include software that provides access to files stored on local file storage 622 and remote storage 624. Applications 616 include software used to perform other functions on user system 600. Operating system 618 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CDROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer system configured to act as a Domain Controller (DC) for a computer network comprising plurality of client computers, the plurality of client computers running an operating system that uses a discretionary access policy regarding file operations, the computer system comprising:
one or more hardware processors communicatively coupled to a non-transitory computer readable storage medium wherein the non-transitory computer readable storage medium comprises instructions stored thereon that when executed by the one or more processors cause the one or more processors to:
receive a login request associated with a first user on a first client computer of the plurality of client computers; and
receive an indication from a mandatory access control agent executing on the first client computer to modify a login session in response to the login request, the login session configured to exclude the first user from a default user group and to associate the first user with a second user group for a duration of the login session;
wherein protected files accessible on the computer network are associated with an access control list that denies access to the default user group and allows access to the second user group; and
wherein the access control agent and the DC implement a security policy regarding file operations within the computer network that is configured by default with the discretionary access policy regarding file operations.

2. The computer system of claim 1, wherein the instructions to cause the one or more processors to receive an indication to modify a login session comprise instructions to cause the one or more processors to receive a user identification and determine using the user identification to create the login session.

3. The computer system of claim 1, wherein the discretionary access policy comprises a discretionary access control policy.

4. The computer system of claim 1, wherein the security policy regarding file operations comprises a mandatory access control policy.

5. The computer system of claim 1, wherein the instructions to cause the one or more processors to receive an indication to modify a login session comprise instructions to cause the one or more processors to receive an indication that the first client computer is configured with a mandatory access control agent.

6. The computer system of claim 1, wherein a second user can authenticate to the DC from a second client computer system without having the login session configured.

7. The computer system of claim 6, wherein the second client computer system is not configured with the access control agent and the second client computer system conforms to the discretionary access policy regarding file operations.

8. The computer system of claim 1, wherein the first user can authenticate to the DC from a second client computer system without having the login session configured based, at least in part, on a condition that the second client computer system is not executing the access control agent.

9. The computer system of claim 1, wherein the DC concurrently provides authentication services for the plurality of client computers and the plurality of client computers comprises at least one client configured with the access control agent and at least one client configured without the access control agent.

10. One or more non-transitory computer readable media comprising instructions stored thereon that when executed by a programmable device configure the programmable device to act as a Domain Controller (DC) for a computer network comprising a plurality of client computers, the plurality of client computers running an operating system that uses a discretionary access policy regarding file operations, the instructions further comprising instructions to configure the programmable device to:
receive a login request associated with a first user on a first client computer selected from the plurality of client computers; and
accept an indication from a mandatory access control agent executing on the first client computer to modify a login session in response to the login request, the login session configured to exclude the first user from a default user group and to associate the first user with a second user group for a duration of the login session;
wherein protected files accessible on the computer network include an access control list that denies access to the default user group and allows access to the second user group; and
wherein the access control agent and the DC implement an security policy regarding file operations within the computer network that is configured by default with the discretionary access policy regarding file operations.

11. The one or more computer readable media of claim 10, wherein the instructions to cause the programmable device to receive an indication to modify a login session comprise instructions to cause the programmable device to receive a user identification and determine using the user identification to create the login session.

12. The one or more computer readable media of claim 10, wherein the discretionary access policy comprises a discretionary access control policy.

13. The one or more computer readable media of claim 10, wherein the security policy regarding file operations comprises a mandatory access control policy.

14. The one or more computer readable media of claim 10, wherein the instructions to cause the programmable device to receive an indication to modify a login session comprise instructions to cause the programmable device to receive an indication that the first client computer is configured with a mandatory access control agent.

15. The one or more computer readable media of claim 10, wherein a second user can authenticate to the DC from a second client computer system without having the login session configured.

16. The one or more computer readable media of claim 15, wherein the second client computer system is not configured with the mandatory access control agent and the second client computer system conforms to the discretionary access policy regarding file operations.

17. The one or more computer readable media of claim 10, wherein the first user can authenticate to the DC from a second client computer system without having the login session configured based, at least in part, on a condition that the second client computer system is not executing the mandatory access control agent.

18. The one or more computer readable media of claim 10, wherein the DC concurrently provides authentication services for the plurality of client computers and the plurality of client computers comprises at least one client configured with the mandatory access control agent and at least one client configured without the mandatory access control agent.

19. A method for configuring a programmable device to act as a Domain Controller (DC) for a computer network comprising a plurality of client computers, the plurality of client computers running an operating system that uses a discretionary access policy regarding file operations, the method comprising:

receiving a login request associated with a first user on a first client computer selected from the plurality of client computers; and accepting an indication from a mandatory access control agent executing on the first client computer to modify a login session in response to the login request, the login session configured to exclude the first user from a default user group and to associate the first user with a second user group for a duration of the login session;

wherein protected files accessible on the computer network include an access control list that denies access to the default user group and allows access to the second user group; and wherein the access control agent and the DC implement an security policy regarding file operations within the computer network that is configured by default with the discretionary access policy regarding file operations.

20. The method of claim 19, wherein receiving an indication to modify a login session comprises:

receiving a user identification; and determining using the user identification to create the login session.

21. The method of claim 19, wherein receiving an indication to modify a login session comprises receiving an indication that the first client computer is configured with a mandatory access control agent.

* * * * *